(12) United States Patent
Tanaka et al.

(10) Patent No.: US 8,531,775 B2
(45) Date of Patent: Sep. 10, 2013

(54) LIQUID LENS AND IMAGE PICKUP APPARATUS

(75) Inventors: Kayoko Tanaka, Tokyo (JP); Yoshiaki Kato, Gunma (JP); Fumisada Maeda, Tokyo (JP); Akira Suzuki, Kanagawa (JP); Sachiko Sakaigawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 41 days.

(21) Appl. No.: 13/063,658

(22) PCT Filed: Sep. 16, 2009

(86) PCT No.: PCT/JP2009/066712
§ 371 (c)(1),
(2), (4) Date: Mar. 11, 2011

(87) PCT Pub. No.: WO2010/032869
PCT Pub. Date: Mar. 25, 2010

(65) Prior Publication Data
US 2011/0176221 A1   Jul. 21, 2011

(30) Foreign Application Priority Data

Sep. 18, 2008   (JP) ................................ 2008-239901
Sep. 7, 2009   (JP) ................................ 2009-206263

(51) Int. Cl.
*G02B 1/06*   (2006.01)

(52) U.S. Cl.
USPC ......................................................... 359/665

(58) Field of Classification Search
USPC .................................................. 359/665–667
See application file for complete search history.

(56) References Cited

U.S. PATENT DOCUMENTS

| | | | | |
|---|---|---|---|---|
| 5,541,776 | A * | 7/1996 | Kobayashi et al. | 359/665 |
| 5,774,274 | A * | 6/1998 | Schachar | 359/666 |
| 7,256,943 | B1 * | 8/2007 | Kobrin et al. | 359/666 |
| 2009/0021823 | A1 * | 1/2009 | Heim et al. | 359/290 |
| 2009/0251792 | A1 * | 10/2009 | Suzuki et al. | 359/666 |

FOREIGN PATENT DOCUMENTS

| | | |
|---|---|---|
| JP | 05-088004 | 4/1993 |
| JP | 06-258502 | 9/1994 |
| JP | 10-206609 | 8/1998 |
| JP | 2002-107678 | 4/2002 |
| JP | 2002-214529 | 7/2002 |
| JP | 2005-284066 | 10/2005 |

* cited by examiner

*Primary Examiner* — Darryl J Collins
(74) *Attorney, Agent, or Firm* — K&L Gates LLP

(57) ABSTRACT

In one example embodiment, a liquid lens includes a pair of transparent members and a transparent liquid composed of a silicone oil not having compatibility with the fluorinated elastomeric membrane. In one example embodiment, at least one of the transparent members is a deformable deformation membrane formed of a fluorinated elastomeric membrane. In one example embodiment, the transparent liquid fills an enclosed space sandwiched between the pair of transparent members.

6 Claims, 12 Drawing Sheets

LIQUID LENS AND IMAGE PICKUP APPARATUS

CROSS REFERENCES TO RELATED APPLICATIONS

The present application is a National Stage of International Application No. PCT/JP2009/066712 filed on Sep. 16, 2009, which claims priority to Japanese Patent Application No. 2008-239901 filed on Sep. 18, 2008 and Japanese Patent Application No. 2009-206263 filed on Sep. 7, 2009, the entire contents of which are being incorporated herein by reference.

BACKGROUND

Various front-mounting conversion lenses (so-called wide converters) have been proposed. Such a conversion lens is attached to an object side position, that is, a position in front of an image pickup lens of an image pickup apparatus such as a still camera or a video camera and configured to change the focal length of the entire image pickup system toward the wide angle side while the focal plane of the entire system is maintained at a certain position.

For example, Japanese Unexamined Patent Application Publication No. 2002-214529 describes a wide-angle conversion lens that is attached to an object side position of a zoom lens, which is a main lens system, and can increase the view angle of the entire lens system. This wide-angle conversion lens is constituted by three lenses: a concave meniscus lens whose convex surface is positioned to face the object side; a plastic aspheric lens; and a convex lens disposed at a position closer to the image side than the position of the concave meniscus lens.

SUMMARY

The present disclosure relates to a liquid lens used as a variable-focal-length lens and an image pickup apparatus including such a liquid lens.

The applicant of the present application previously proposed a liquid lens functioning as a variable-focal-length lens. This liquid lens includes a pair of transparent members one of which is a transparent and deformable deformation membrane, and liquid contained in the airtight space sandwiched between the pair of transparent members. The liquid lens is configured to alter the focal length by applying an external force to the contained liquid to thereby deform the transparent deformation membrane into a convex spherical shape or a concave spherical shape. Thus, the liquid lens can be used as a conversion lens that allows switching from a normal focal length region to a wide-angle region and a macro region.

Such a liquid lens is desirably constituted so as not to have problems such as a deformation membrane that does not deform into spherical shapes due to swelling or dissolution of the deformation membrane caused by the liquid; and a contained liquid that bleeds out through the deformation membrane. Such problems can be solved with a deformation membrane formed of a resin thin film or a glass thin film. However, in this case, the flexibility of the deformation membrane is degraded and the variable focal length range of the lens is considerably decreased. Thus, desired lens characteristics are not provided.

In one example embodiment, the present disclosure provides a liquid lens in which swelling, dissolution, and bleeding out of the liquid do not occur, and a variable focal length range is large; and an image pickup apparatus including such a liquid lens.

In one example embodiment, a liquid lens according to the present disclosure includes a pair of transparent members at least one of which is a deformable deformation membrane formed of a fluorinated elastomeric membrane; and a transparent liquid composed of a silicone oil not having compatibility with the fluorinated elastomeric membrane, the transparent liquid filling an enclosed space sandwiched between the pair of transparent members.

In one example embodiment, the silicone oil is preferably a silicone oil having a weight-average molecular weight of 500 or more and a viscosity of 50 (25° C. mm2/s) or more.

In one example embodiment, the silicone oil is preferably a methylphenyl silicone oil.

In one example embodiment, an image pickup apparatus includes an image pickup apparatus body including an image pickup optical system; and any one of the above-described liquid lenses being attached to an object side position of the image pickup optical system of the image pickup apparatus body.

In one example embodiment, liquid lenses employ, as the combinations of a deformation membrane and liquid, the above-described combinations of an elastomeric membrane and a silicone oil. As a result, the deformation membranes are chemically stable; swelling of the deformation membranes caused by the liquids, that is, a variation rate in weight is low; and bleeding out of the liquids does not occur.

In one example embodiment, in a liquid lens, a deformation membrane has a low variation rate in volume caused by liquid swelling and bleeding out of the liquid is prevented. Thus, a liquid lens can be provided that is chemically stable, achieves a sufficient membrane deformation amount, and allows a large variable focal length range.

In one example embodiment, an image pickup apparatus to which such a liquid lens is being attached allows switching among wide shooting, normal shooting, and macro shooting. Such an image pickup apparatus can be stably used for a long period of time.

Additional features and advantages are described herein, and will be apparent from the following Detailed Description and the figures.

DETAILED DESCRIPTION

Hereinafter, embodiments for carrying out the disclosure (hereafter, referred to as embodiments) will be described. Note that descriptions will be performed in the following order.

1. Liquid lenses according to embodiments of the present disclosure (summary)

2. First embodiment (schematic configuration example of liquid lens)

3. Second embodiment (schematic configuration example of liquid lens)

4. Third embodiment (schematic configuration example of liquid lens)

5. Fourth embodiment (schematic configuration example of liquid lens)

6. Embodiments of combinations of materials for deformation membrane and liquid

7. Fifth embodiment (schematic configuration example of image pickup apparatus)

1. Liquid Lenses According to Embodiments of the Present Disclosure

[Summary]

Liquid lenses according to embodiments of the present disclosure each employs a specific combination of materials for a deformation membrane and liquid. As a result, such a liquid lens is chemically stable, achieves a sufficient membrane deformation amount, and allows a large variable focal length range.

2. First Embodiment

[Schematic Configuration Example of Liquid Lens]

Figure 1:
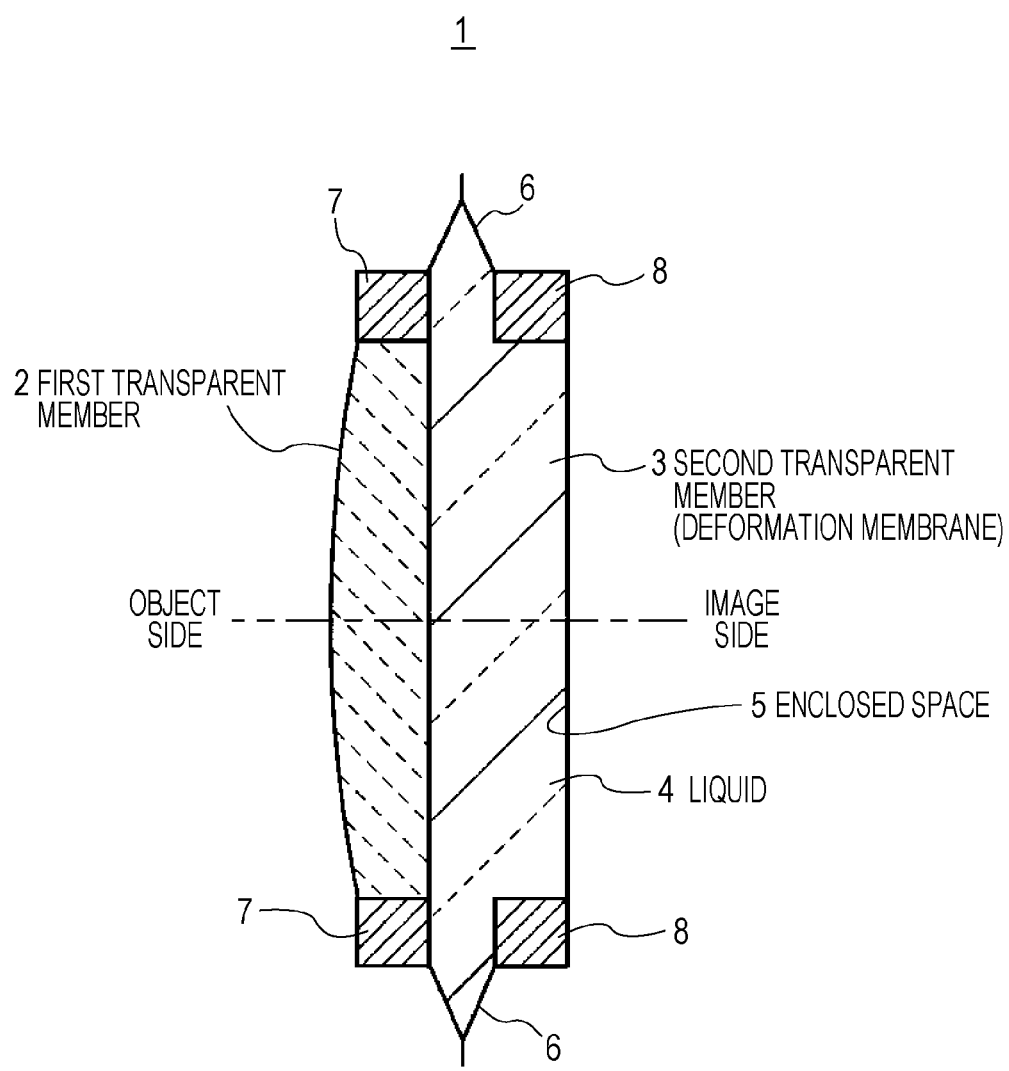
FIG. 1 is a schematic sectional view showing the configuration of a liquid lens according to a first example embodiment of the present disclosure.
Figure 2:
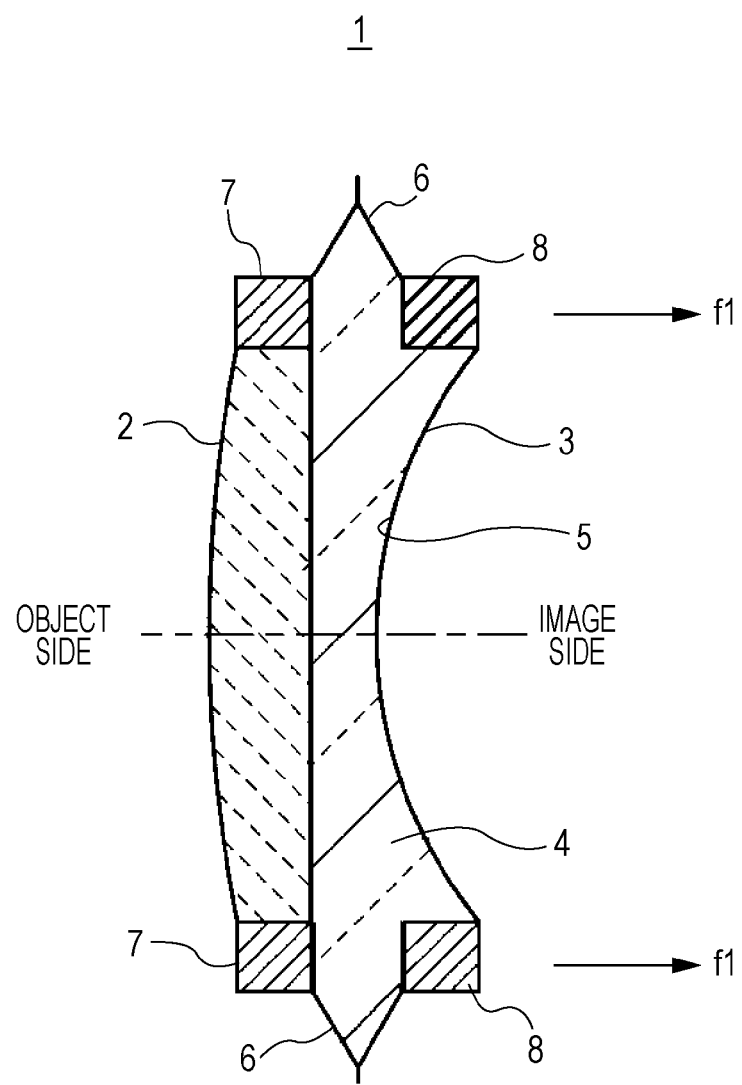
FIG. 2 is a schematic sectional view for describing an operation of the liquid lens according to the first example embodiment.
Figure 3:
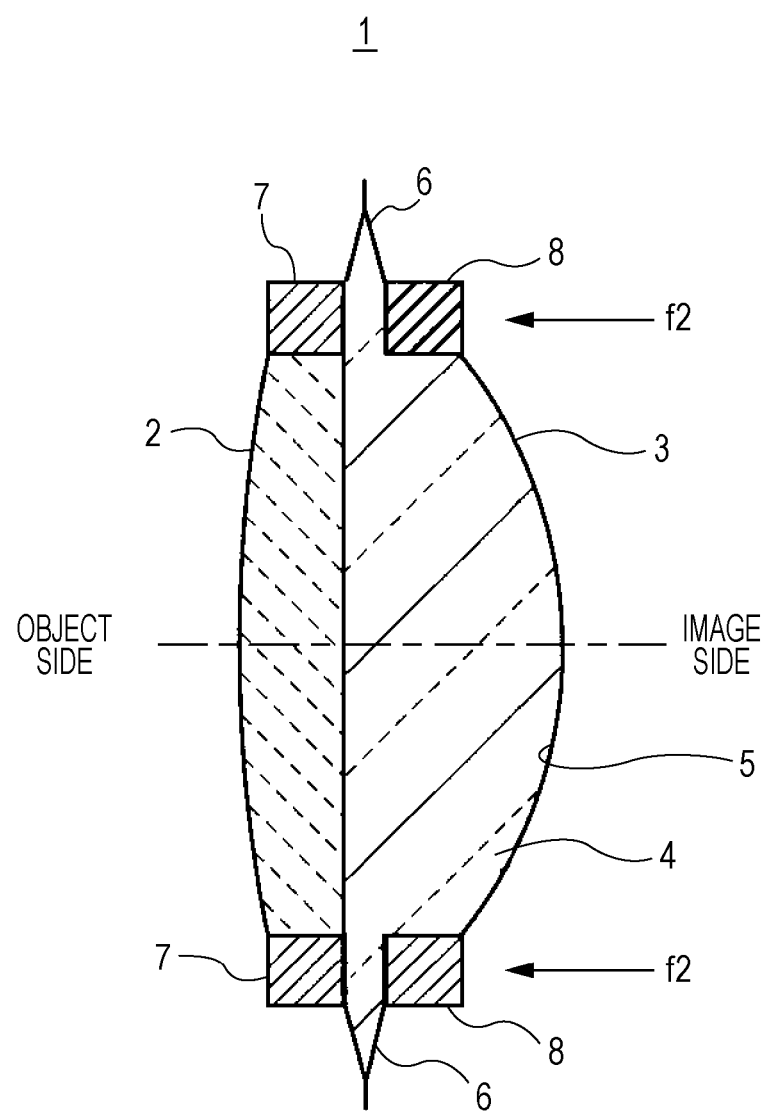
FIG. 3 is a schematic sectional view for describing an operation of the liquid lens according to the first example embodiment.

FIGS. 1 to 3 show schematic configurations of a liquid lens according to a first embodiment of the present disclosure. As illustrated in FIG. 1, a liquid lens 1 according to the present embodiment includes a pair of transparent members constituted by a first transparent member 2 being fixed, and a second transparent member 3 formed of a deformable deformation membrane; and transparent liquid 4 filling an enclosed space 5 sandwiched between the pair of transparent members. Of the pair of transparent members constituting the liquid lens 1, the first transparent member 2 is disposed on the object side while the second transparent member, which is a deformation membrane, is disposed on the image side. The first transparent member 2 being fixed in the present example is constituted by a fixed lens. The liquid lens 1 according to the example is a combined-type doublet lens including a fixed lens serving as the first transparent member 2, and the liquid 4 whose boundary surfaces are defined by a deformation membrane serving as the second transparent member 3 and the fixed lens of the first transparent member 2.

The fixed lens serving as the first transparent member 2 is composed of a transparent material having light transmittance such as glass, acrylic, or plastic. The fixed lens is formed so as to have a convex spherical surface on the object side and a flat surface being in contact with the liquid 4.

The deformable deformation membrane serving as the second transparent member 3 is a transparent membrane having elasticity, flexibility, and light transmittance. The liquid 4 filling the enclosed space 5 is a transparent liquid having light transmittance. In the present embodiment, as will be obvious from what is described below, an optimal combination of materials is used for the deformation membrane serving as the second transparent member 3 and the liquid 4.

The first transparent member 2 and the second transparent member 3 are joined along the circumference with a connection part 6 having the shape of a ring or the like therebetween so as to form the enclosed space 5 sandwiched between the transparent members 2 and 3. The connection part 6 is connected to the first transparent member 2 with a first frame 7 therebetween, the first frame 7 being joined to the circumference of the first transparent member 2. The connection part 6 is connected to the second transparent member 3 with a second frame 8 therebetween, the second frame 8 being joined to the circumference of the second transparent member 3. The liquid 4 filling the enclosed space 5 is sealed therein in a liquid-tight manner by the connection part 6. The connection part 6 has a bellows structure that is pleated and extendable. This bellows structure can be formed by, for example, joining flexible sheets by heat sealing or the like, the sheets being obtained by laminating a hermetic thin aluminum foil and a resin such as polyethylene.

The amount of the liquid 4 filling the enclosed space 5 is adjusted such that the deformation membrane serving as the second transparent member 3 can be maintained flat.

Hereinafter, operations of the liquid lens 1 in the first embodiment are described. As illustrated in FIG. 1, in the liquid lens 1 in the normal state, the deformation membrane serving as the second transparent member 3 is maintained flat. In addition, the curvature of the deformation membrane serving as the second transparent member in the liquid lens 1 can be altered by, while the first frame 7 or the second frame 8 is fixed, pulling away or pushing unfixed one of the frames to thereby apply pressure to the contained liquid 4.

For example, as illustrated in FIG. 2, where the first frame 7 is fixed, pulling away the second frame 8 in the direction represented by arrow f1 extends the connection part 6 having a bellows structure and deforms the deformation membrane into a concave shape, the deformation membrane serving as the second transparent member 3 surrounded by the second frame 8.

Specifically, since the volume of the liquid 4 filling the enclosed space 5 is constant, extending the spacing between the first frame 7 and the second frame 8 in the circumference causes the liquid 4 to move toward the circumference. This reduces the volume of the liquid in the central region surrounded by the first frame 7 and the second frame 8. At this time, since the first transparent member 2 is constituted by a fixed lens, as illustrated in FIG. 2, the second transparent member 3 constituted by a deformation membrane deforms into a concave shape. As a result, the lens constituted by the liquid 4 and the second transparent member 3 that is a deformation membrane functions as a concave lens.

Conversely, unfixed one of the first frame 7 and the second frame 8 is pushed while the other one of the frames is fixed. For example, as illustrated in FIG. 3, where the first frame 7 is fixed, pushing the second frame 8 in the direction represented by arrow f2 contracts the connection part 6 having a bellows structure and deforms the deformation membrane into a convex shape, the deformation membrane serving as the second transparent member 3 surrounded by the second frame 8.

Specifically, since the volume of the liquid 4 filling the enclosed space 5 is constant, reducing the spacing between the first frame 7 and the second frame 8 in the circumference causes the liquid 4 to move toward the central region surrounded by the first frame 7 and the second frame 8. Thus, the liquid volume in the central region increases. At this time, as illustrated in FIG. 3, since the first transparent member 2 is constituted by a fixed lens, the second transparent member 3 constituted by a deformation membrane deforms into a convex shape. As a result, the lens constituted by the liquid 4 and the second transparent member 3 that is a deformation membrane functions as a convex lens.

In summary, the curvature of the second transparent member 3 that is a deformation membrane surrounded by the second frame 8 in the liquid lens 1 according to the first embodiment can be altered by pulling away or pushing one of the first frame 7 and the second frame 8 while the other one of the frames is fixed.

3. Second Embodiment

[Schematic Configuration Example of Liquid Lens]

Figure 4:
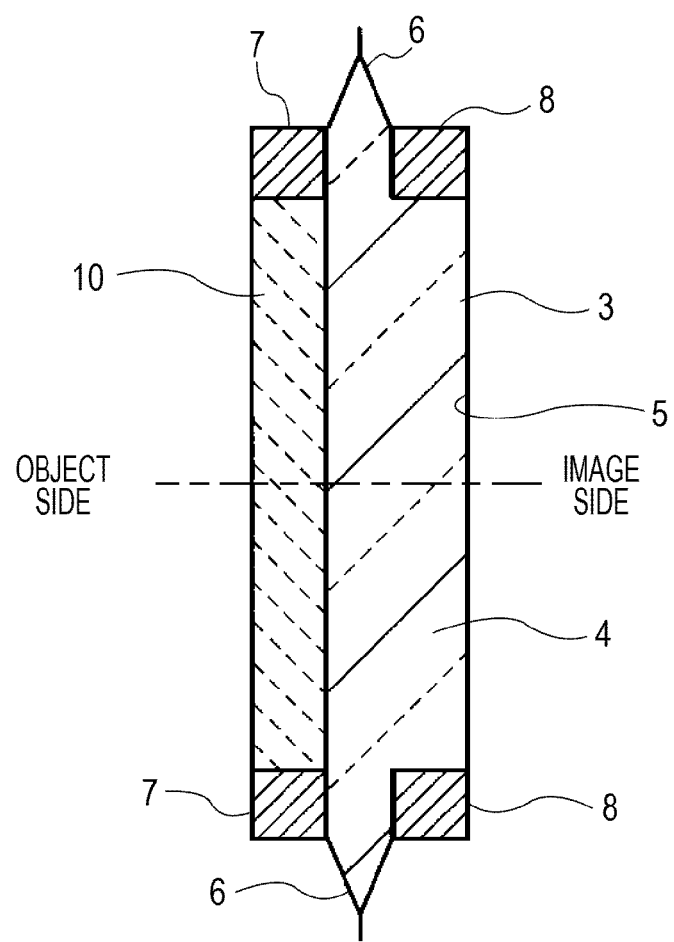
FIG. 4 is a schematic sectional view showing the configuration of a liquid lens according to a second example embodiment.

FIG. 4 shows the schematic configuration of a liquid lens according to a second embodiment of the present disclosure. A liquid lens 9 according to the second embodiment includes a fixed parallel plate 10 serving as the first transparent member. The other configuration is the same as in FIG. 1 and hence components corresponding to those in FIG. 1 are designated with identical reference signs and redundant descriptions are omitted. Operations of the liquid lens of the second embodiment are the same as those described in FIGS. 1 to 3.

4. Third Embodiment

[Schematic Configuration Example of Liquid Lens]

Figure 5:
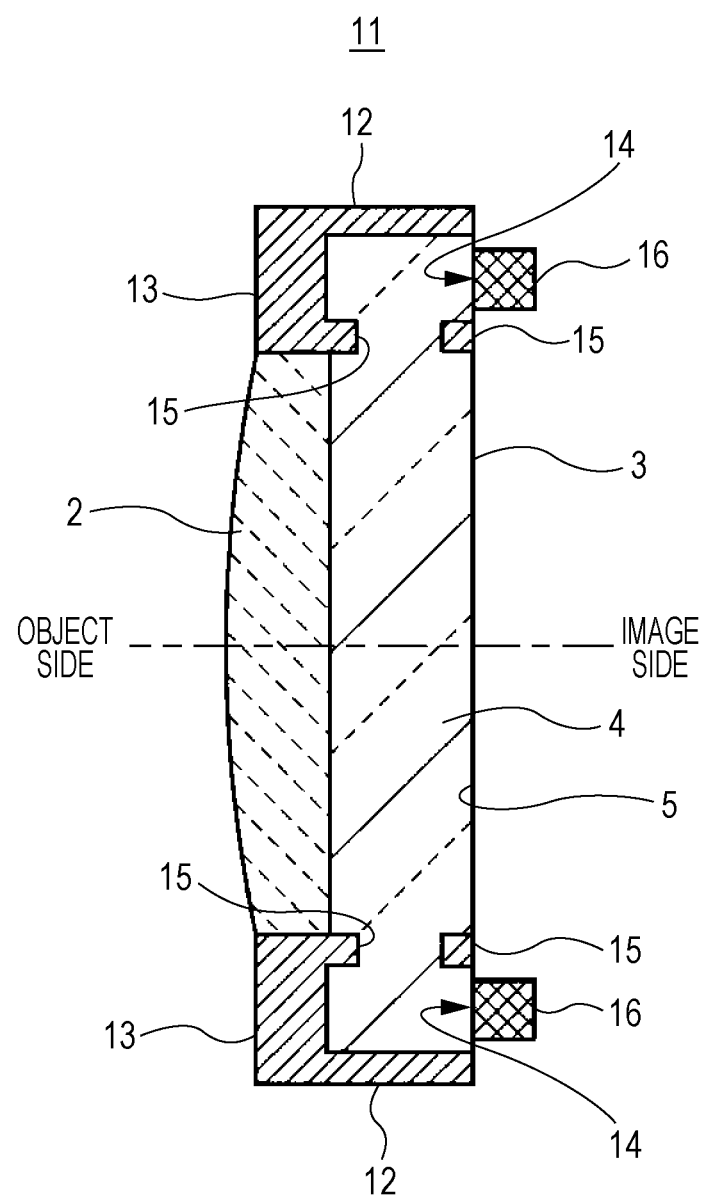
FIG. 5 is a schematic sectional view showing the configuration of a liquid lens according to a third example embodiment.

FIG. 5 shows the schematic configuration of a liquid lens according to a third embodiment of the present disclosure. A liquid lens 11 according to the third embodiment includes a connection part 12 and a frame 13 that are integrally formed, the connection part 12 serving to connect the first transparent member 2 and a deformation membrane serving as the second transparent member 3, the frame 13 being provided along the circumference of the first transparent member and having the shape of a ring or the like. The circumference of the second transparent member constitutes a diaphragm 14. A partition plate 15 is formed, in the second transparent member 3, along the boundary between the main portion constituting the liquid lens and the circumference constituting the diaphragm 14, and on a surface of the second transparent member 3, the surface being in contact with the liquid 4. An opening 15*a* is formed in a portion of the partition plate 15. A supporting part 16 is formed on a surface of the second transparent member 3 constituting the diaphragm 14.

The partition plate 15 is configured to partition the liquid 4 into the main portion and the circumference while the liquid 4 can move between the main portion and the circumference via the opening 15*a*. The partition plate 15 is formed so as to be partially connected to the connection part 12. The diaphragm 14 may be integrally formed with the second transparent member 3 or may be separately formed of a flexible member.

The other configuration is the same as in FIG. 1 described above and hence corresponding components are designated with identical reference signs and redundant descriptions are omitted.

Figure 6:
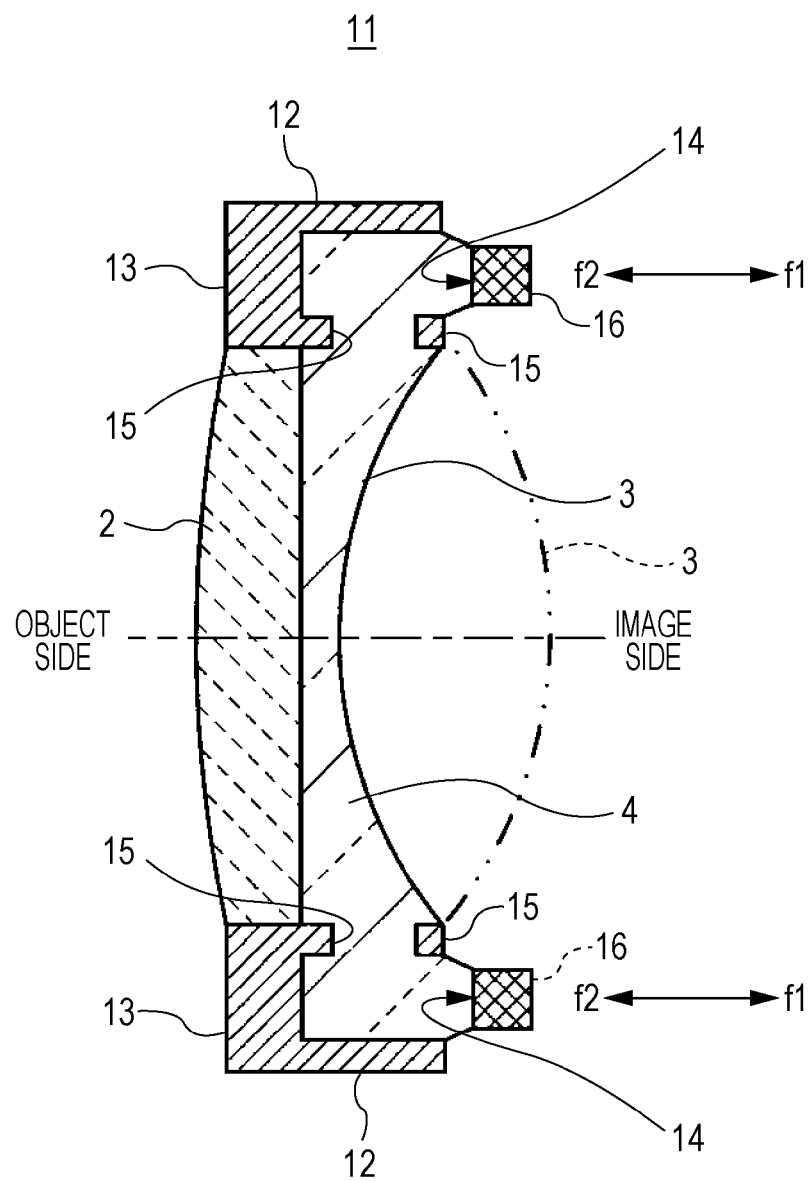
FIG. 6 is a schematic sectional view for describing an operation of the liquid lens according to the third example embodiment.

As illustrated in FIG. 6, the curvature of the second transparent member 3 is altered in the liquid lens 11 according to the third embodiment by pushing or pulling away the supporting part 16 to thereby increase or decrease the volume of the liquid 4 in the central region. In FIG. 6, the solid line represents the state of a concave lens and the dashed line represents the state of a convex lens.

5. Fourth Embodiment

[Schematic Configuration Example of Liquid Lens]

Figure 7:
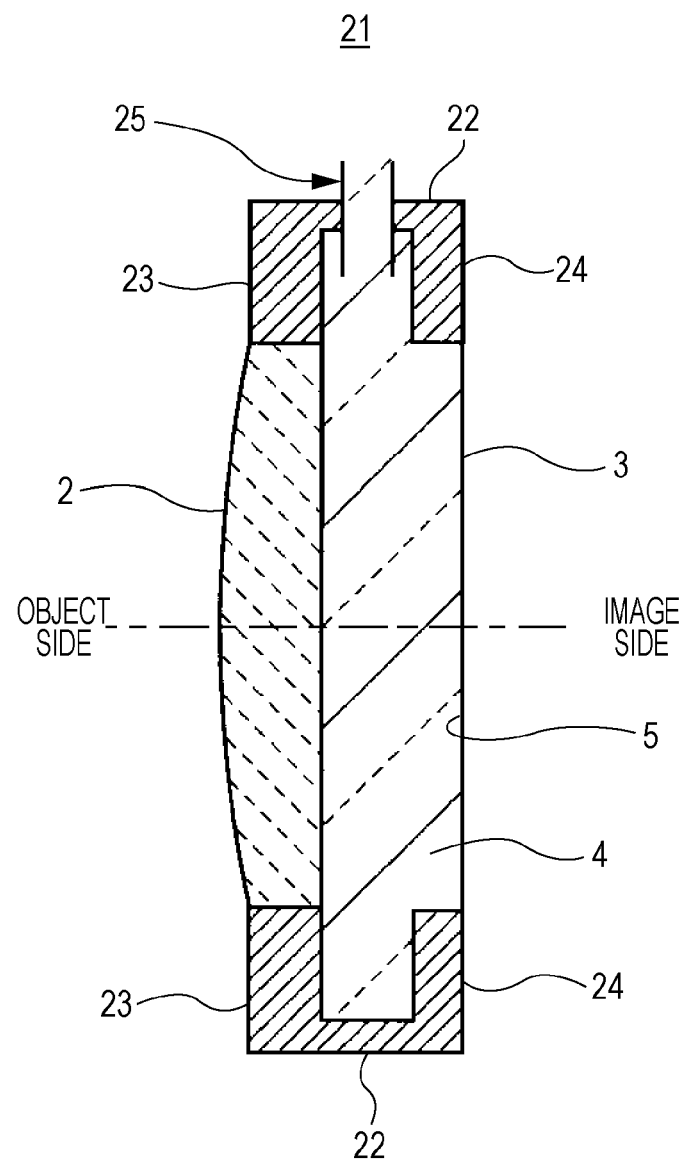
FIG. 7 is a schematic sectional view showing the configuration of a liquid lens according to a fourth example embodiment.

FIG. 7 shows the schematic configuration of a liquid lens according to a fourth embodiment of the present disclosure. A liquid lens 21 according to the fourth embodiment includes a connection part 22, a first frame 23, and a second frame 24 that are integrally formed. The connection part 22 connects the first transparent member 2 and the second transparent member 3. The first frame 23 is provided along the circumference of the first transparent member 2. The second frame 24 is provided along the circumference of the second transparent member 3. A liquid passage 25 having the shape of, for example, a tube is formed in a portion of the connection part 22. This liquid passage 25 permits movement of the liquid 4 filling the enclosed space 5. The liquid passage 25 is configured to pass the liquid 4, that is, to feed and drain the liquid 4 to and from the enclosed space 5 by driving an external pump system or the like (not shown). The liquid passage 25 is provided at a port through which the liquid flows into the enclosed space 5.

The other configuration is the same as in FIG. 1 described above and hence corresponding components are designated with identical reference signs and redundant descriptions are omitted.

Figure 8:
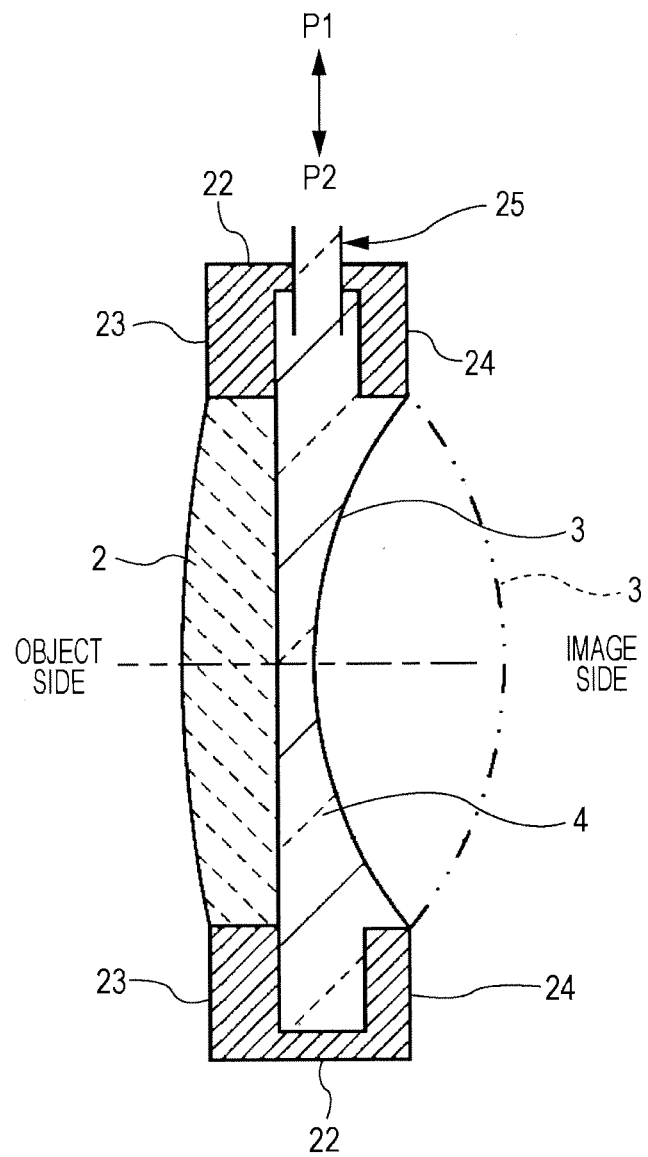
FIG. 8 is a schematic sectional view for describing an operation of the liquid lens according to the fourth example embodiment.

The liquid lens 21 according to the fourth embodiment is configured to alter the volume of the liquid 4 filling the enclosed space 5 by moving the liquid 4 filling the enclosed space 5 by driving an external pump system. In this way, as illustrated in FIG. 8, the curvature of the second transparent member 3 constituted by a deformable deformation membrane can be altered. In FIG. 8, the solid line represents the state of a concave lens formed as a result of movement of the liquid 4 in the direction of arrow P1, and the dashed line represents the state of a convex lens formed as a result of movement of the liquid 4 in the direction of arrow P2.

The third and fourth embodiments may have a configuration in which the first transparent member is replaced with the fixed parallel plate 10 as in the second embodiment (FIG. 4).

Furthermore, a configuration may be employed in which a deformation membrane is used as the first transparent member as with the second transparent member. In summary, a liquid lens according to the present disclosure may employ various combinations of the pair of transparent members depending on lens design as long as at least one of the pair of the transparent members is constituted by a deformable deformation membrane.

6. Embodiments of Combinations of Materials for Deformation Membrane and Liquid As described above, each liquid lens (that is, variable-focal-length lens) according to the present embodiments is configured to change the volume of contained liquid under a deformation membrane to thereby deform the deformation membrane into a convex spherical shape or a concave spherical shape. It is important that such a deformation membrane does not swell or dissolve due to the liquid, or let the liquid bleed out therethrough. It has been recognized that the deformation membrane is preferably an elastomeric membrane and the liquid is preferably an oil. However, the inventors of the present disclosure have found preferred combinations of an elastomeric membrane and an oil that particularly ensure stability for a long period of time.

Hereinafter, results of verifying the stability of the preferred material combinations of an elastomeric membrane serving as the deformation membrane and an oil serving as the liquid are shown.

First, the background of the verification will be described so that the present disclosure will be easily understood. In an example, when a deformation membrane was formed of a urethane elastomer and a liquid was composed of a methylphenyl silicone oil, good lens characteristics were initially exhibited. However, when the lens was used again after the lapse of one month, the lens was found to be optically unusable because the deformation membrane distorted and the liquid bled out. Such a phenomenon did not occur in other combinations of materials employed in production at the same time. Thus, it was hypothesized that there is variation in the stability of liquid lenses depending on the combinations of a silicone oil and an elastomeric membrane.

It is generally recognized that immersing vulcanized rubber material into oil or a solvent causes the material to swell and an immersion test method (JIS K 6301) is defined in Japanese Industrial Standards (JIS). Since silicone oil has high molecular weight and low volatility compared with mineral oil used in the test, it is thought that silicone oil is stably used with elastomeric membranes. However, since combinations of deformation membranes and oils caused variation in the characteristics as described above, verification of silicone oils and transparent elastomeric materials was performed.

[Verification Tests]

Figure 9:
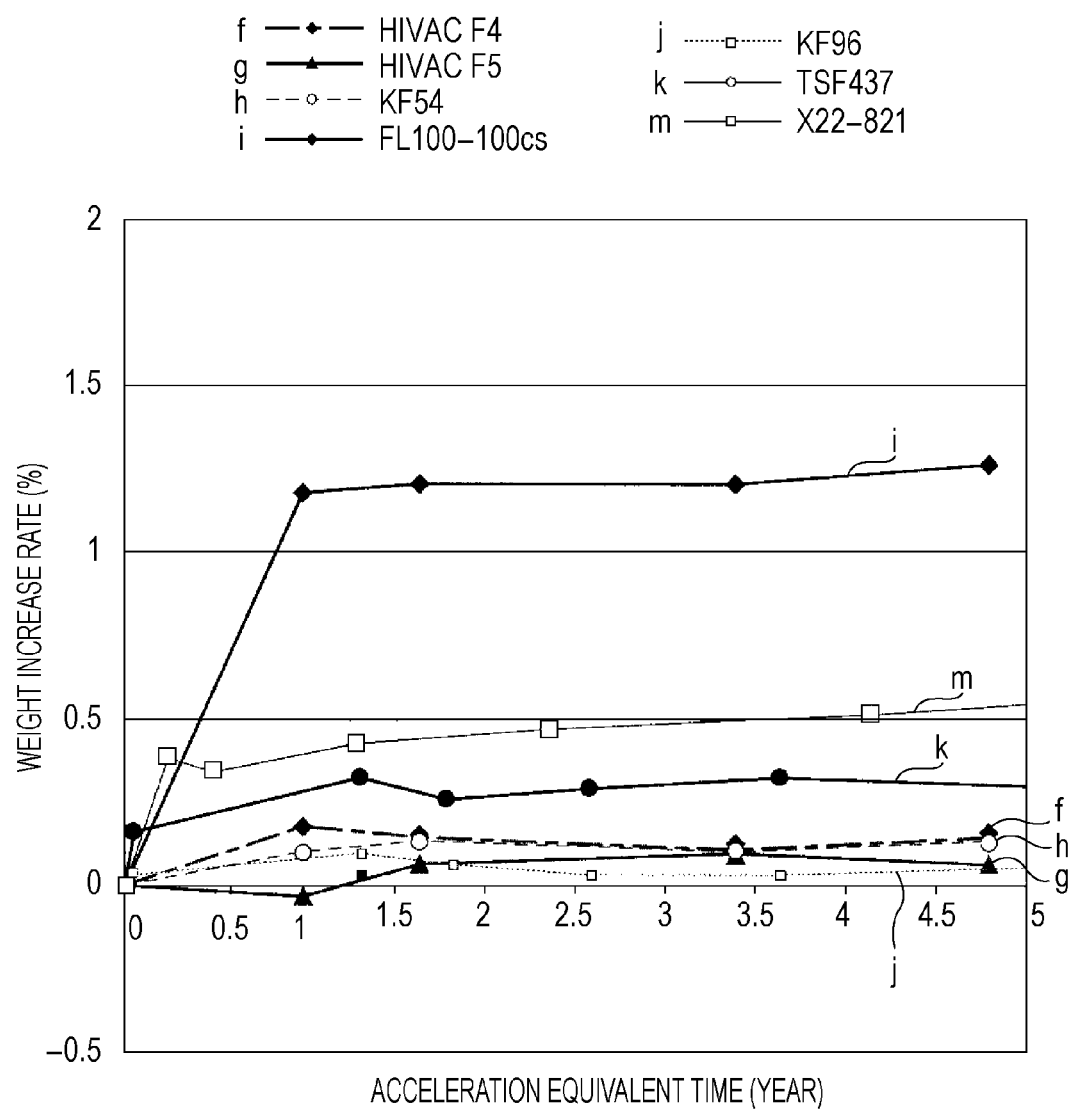
FIG. 9 is a graph showing the results of an example immersion swelling test in terms of a fluorinated elastomeric membrane.

First, a fluorinated elastomer (T530) was cut into dimensions of 10 mm×10 mm×2 mm, immersed into oils and then withdrawn from the oils after the lapse of certain periods, and measured to determine variation in weight. During the immersion, the temperature was maintained at 85° C. and an about 90-times accelerated test was performed. FIG. 9 shows the results of the immersion swelling test in which the fluorinated elastomer and various oils were used. In FIG. 9, the abscissa axis indicates elapsed years calculated from immersion time and the ordinate axis indicates a weight variation rate (%). In FIG. 9, Curve f corresponds to HIVAC-F4, Curve g corresponds to HIVAC-F5, Curve h corresponds to KF54, Curve i corresponds to FL100-100cs, Curve j corresponds to KF96-100cs, Curve k corresponds to TSF437, and Curve m corresponds to X-22-821.

Figure 10:
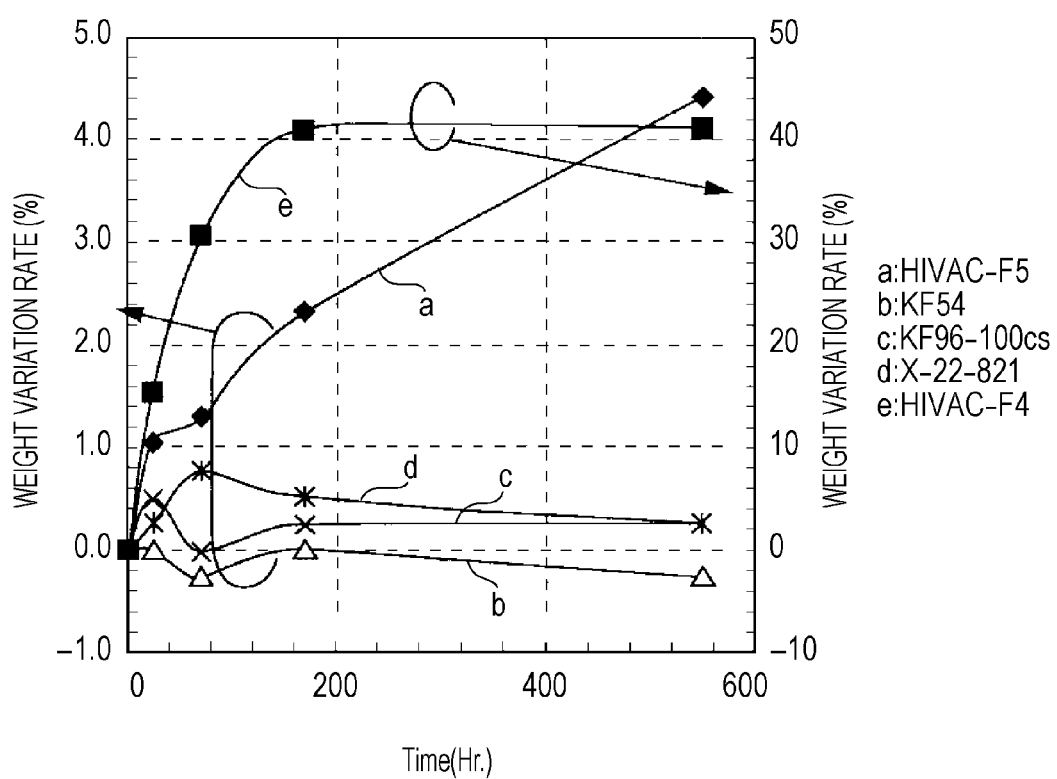
FIG. 10 is a graph showing the results of an example immersion swelling test in terms of a polyurethane elastomeric membrane.

Next, a polyurethane elastomer (XN2001) was cut into dimensions of 20 mm×50 mm×0.2 mm, immersed into oils and then withdrawn from the oils after the lapse of certain periods, and measured to determine variation in weight and variation in volume. FIG. 10 shows the results of the immersion swelling test in which the polyurethane elastomer and various oils were used. In FIG. 10, the abscissa axis indicates immersion time and the ordinate axes indicate weight variation rates. In FIG. 10, Curve a corresponds to HIVAC-F5, Curve b corresponds to KF54, Curve c corresponds to KF96-100cs, Curve d corresponds to X-22-821, and Curve e corresponds to HIVAC-F4.

Similar measurements were also performed in terms of elastomeric membranes (not shown in the form of graphs), and the weight variation rates (%) in these elastomeric membranes are summarized in Table 1. A weight variation rate of less than 0.5% was evaluated as Good. A weight variation rate of 0.5% to less than 1% was evaluated as Fair. A weight variation rate of 1% or more was evaluated as Poor. Absence of a measurement sample was represented by -. To achieve a stable use of a liquid lens, a weight variation rate in the immersion swelling test is preferably less than 0.5%.

Furthermore, as for elastomeric membranes that can be prepared so as to have a small thickness of 100 to 200 μm, samples that had the same shape as a lens and were filled with the liquid 4 so as to always have a convex shape were prepared and measured whether the bleeding out of the liquid occurred or not. The measurement results are shown in Tables 2 and 3. After all the samples were left at room temperature for one month or more, whether the bleeding out occurred or not was inspected: samples in which the bleeding out did not occur and distortion of the membranes did not occur were evaluated as Good; samples in which the bleeding out did not occur and distortion of the membranes occurred were evaluated as Fair; samples in which the bleeding out occurred were evaluated as Poor; and absence of a measurement sample was represented by -.

Table 2 shows evaluation of liquid lenses after the lapse of 2 years. Table 3 shows evaluation of liquid lenses after the lapse of 10 years (equivalent). As for Table 3, samples having been evaluated as being absent of the bleeding out in Table 2 were subjected to an accelerated test at 85° C. and the state thereof after the lapse of 10 years (equivalent) was observed. Long-term reliability can be examined with the accelerated test.

TABLE 1

| | | Oil type | | | | | | | |
|---|---|---|---|---|---|---|---|---|---|
| | | Methylphenyl Low ← Molecular weight → High | | | | Dimethyl | Fluorine-modified | | Other |
| Elastomer type | | HIVAC-F4 | HIVAC-F5 | SH705 | TSF 437 | KF54 | KF96-100cs | X-22-821 | FL100-100cs | ethylene glycol |
| Polyurethane elastomers | XN2001 | Poor | Poor | Poor | Poor | Good | Good | Good | Good | Poor |
| | Pit cushion | Poor | Poor | — | — | Good | Fair | Good | — | — |
| | NY85A | Poor | Poor | — | — | Poor | — | — | Good | — |
| Fluorinated elastomers | T530 | Good | Good | — | Good | Good | Good | Fair | Poor | — |
| | SIFEL | — | Good | Good | Fair | Good | Good | Good | Fair | — |
| Silicone rubber | KE1935 | Poor | Poor | Poor | — | Poor | Poor | Poor | Good | — |

TABLE 2

| | | Oil type | | | | | | | | |
|---|---|---|---|---|---|---|---|---|---|---|
| | | Methylphenyl Low ← Molecular weight → High | | | | | Dimethyl | Fluorine-modified | | Other |
| Elastomer type | | HIVAC-F4 | HIVAC-F5 | SH705 | TSF 437 | KF54 | KF96-100cs | X-22-821 | FL100-100cs | ethylene glycol |
| Polyurethane elastomers | XN2001 | — | Poor | Poor | — | Poor | Good | — | Good | Evaporated |
| | Pit cushion | Poor | Poor | — | Good | Good | Good | Good | Good | Evaporated |
| | NY85A | Poor | Poor | — | — | Poor | Poor | Good | Good | Evaporated |
| Fluorinated elastomers | T530 | — | — | — | — | — | — | — | — | — |
| | SIFEL | Poor | Good | — | Good | Good | Good | — | Good | — |
| Silicone rubber | KE1935 | Poor | Poor | Poor | Poor | Poor | — | Poor | Good | Evaporated |

TABLE 3

| | | Oil type | | | | | | | | |
|---|---|---|---|---|---|---|---|---|---|---|
| | | Methylphenyl Low ← Molecular weight → High | | | | | Dimethyl | Fluorine-modified | | Other |
| Elastomer type | | HIVAC-F4 | HIVAC-F5 | SH705 | TSF 437 | KF54 | KF96-100cs | X-22-821 | FL100-100cs | ethylene glycol |
| Polyurethane elastomers | XN2001 | — | Poor | Poor | — | Poor | Good | — | Poor | Evaporated |
| | Pit cushion | Poor | Poor | — | Fair | Fair | Fair | Fair | Poor | Evaporated |
| | NY85A | Poor | Poor | — | — | Poor | Poor | Poor | Poor | Evaporated |
| Fluorinated elastomers | T530 | — | — | — | — | — | — | — | — | — |
| | SIFEL | Poor | Good | — | Fair | Good | Good | — | Poor | — |
| Silicone rubber | KE1935 | Poor | Poor | Poor | Poor | Poor | — | Poor | Poor | Evaporated |

Table 4 shows results whether the elastomeric membranes and the silicone oils can be combined or not on the basis of the test results in Tables 1 and 3. Table 4 particularly shows the relationship between the molecular weights of the oils and swelling.

The elastomeric membrane samples were polyurethane elastomeric membranes, fluorinated elastomeric membranes, and a silicone elastomeric membrane.

[Polyurethane Elastomers]
XN2001 (trade name, manufactured by Nippon Polyurethane Industry Co., Ltd.)
Pit cushion (trade name, manufactured by Exseal Corporation, Ltd.)
NY85A (trade name, manufactured by BASF Japan Ltd.)

[Fluorinated Elastomers]
T530 (trade name, manufactured by DAIKIN INDUSTRIES, LTD.)
SIFEL3155 (trade name, manufactured by Shin-Etsu Chemical Co., Ltd.)

[Silicone Rubber]
KE1935 (trade name, manufactured by Shin-Etsu Chemical Co., Ltd.)

The silicone oil samples were methylphenyl silicone oils, a dimethyl silicone oil, and fluorine-modified silicone oils. Specifically, the following samples were used.

[Methylphenyl Silicone Oils]
HIVAC-F4 (Mw=476, viscosity: 37, trade name, manufactured by Shin-Etsu Chemical Co., Ltd.)
HIVAC-F5 (Mw=563, viscosity: 160, trade name, manufactured by Shin-Etsu Chemical Co., Ltd.)
SH705 (Mw=554, viscosity: 180, trade name, manufactured by Dow Corning Toray Co., Ltd.)
TSF437 (Mw=755, viscosity: 22, trade name, manufactured by Momentive Performance Materials Inc.)
KF54 (Mw=2770, viscosity: 400, trade name, manufactured by Shin-Etsu Chemical Co., Ltd.) [Dimethyl silicone oil]
KF96-100cs (Mw=7730, viscosity: 100, trade name, manufactured by Shin-Etsu Chemical Co., Ltd.) [Fluorine-modified silicone oils]
FL100-100cs (Mw=1960, viscosity: 100, trade name, manufactured by Shin-Etsu Chemical Co., Ltd.)
X-22-821 (Mw=7790, viscosity: 100, trade name, manufactured by Shin-Etsu Chemical Co., Ltd.) Note that Mw represents weight-average molecular weight (in terms of styrene).

[Other]
Ethylene Glycol

TABLE 4

| | | Oils | | | | | | | |
|---|---|---|---|---|---|---|---|---|---|
| | Type | Methylphenyl | | | | Dimethyl | Fluorine-modified | | |
| | Mw | 476 | 550 to 570 | 750 | 2770 | 7730 | 1960 | 7790 | |
| | Viscosity (mm²/s @25° C.) | 37 | 160 to 180 | 22 | 400 | 100 | 100 | 100 | |
| | Product No. | HIVAC-F4 | HIVAC-F5 | TSF437 | KF54 | KF96-100cs | FL100-100cs | X-22-821 | |
| Elastomers | Polyurethane | Poor | Poor | Poor | Poor | Fair | Poor | Poor | |
| | Fluorinated | Poor | Good | Poor | Good | Good | Poor | Fair | |
| | Silicone | Poor | Poor | Poor | Poor | Poor | Poor | Poor | |

Table 4 above shows that the following combinations of elastomeric membranes serving as deformation membranes and silicone oils serving as liquids are desirable for providing stable liquid lenses.

(1) a fluorinated elastomeric membrane and a silicone oil not having compatibility with the fluorinated elastomeric membrane (2) preferably, a fluorinated elastomeric membrane and a silicone oil having a molecular weight of 500 or more and a viscosity of 50 (25° C. mm$^2$/s) or more (3) preferably, a fluorinated elastomeric membrane and a methylphenyl silicone oil or a dimethyl silicone oil having a molecular weight of 500 or more and a viscosity of 50 (25° C. mm$^2$/s) or more (4) a polyurethane elastomeric membrane and a dimethyl silicone oil Specifically, the silicone oil in (1) above is a silicone oil with a functional group not having compatibility with the fluorinated elastomeric membrane.

XN-2001, which can be applied as the polyurethane elastomeric membrane in (4) above, is a thermoplastic polyurethane elastomer containing a non-yellowing isocyanate and a polycarbonate polyol. XN-2001 is a polyurethane elastomer having a low probability of blooming. Note that blooming is a phenomenon that a white powder comes out on the surface of polyurethane.

A liquid lens according to the present embodiment employs any one of the combinations (1) to (4) for the combination of an elastomeric membrane serving as the deformation membrane 3 and a silicone oil serving as the liquid 4. As a result, a liquid lens can be produced that is chemically stable, achieves a sufficient membrane deformation amount, and allows a large variable focal length range. For example, when a soft elastomeric membrane and a silicone oil having a refractive index of 1.5 are used, a liquid lens having a large variable focal length range covering a flat surface to a focal length of f9 can be produced.

The above-described liquid lens according to an embodiment of the present disclosure is configured to alter the curvature of the deformation membrane serving as the second transparent member 3 by changing the volume of the liquid 4, and the liquid lens functions as a so-called variable-focal-length lens. In addition, such a liquid lens functioning as a variable-focal-length lens can be used as a conversion lens for varying the focal length of an image pickup apparatus such as a still camera or a video camera, the conversion lens being attached to an object side position, that is, a position in front of an image pickup lens of the body of such an image pickup apparatus. Attaching a liquid lens according to the present embodiment functioning as a conversion lens to the body of an image pickup apparatus allows switching among wide shooting, normal shooting, and macro shooting without removing the conversion lens from the image pickup body.

7. Fifth Embodiment

[Configuration Example of Image Pickup Apparatus]

Figure 11:
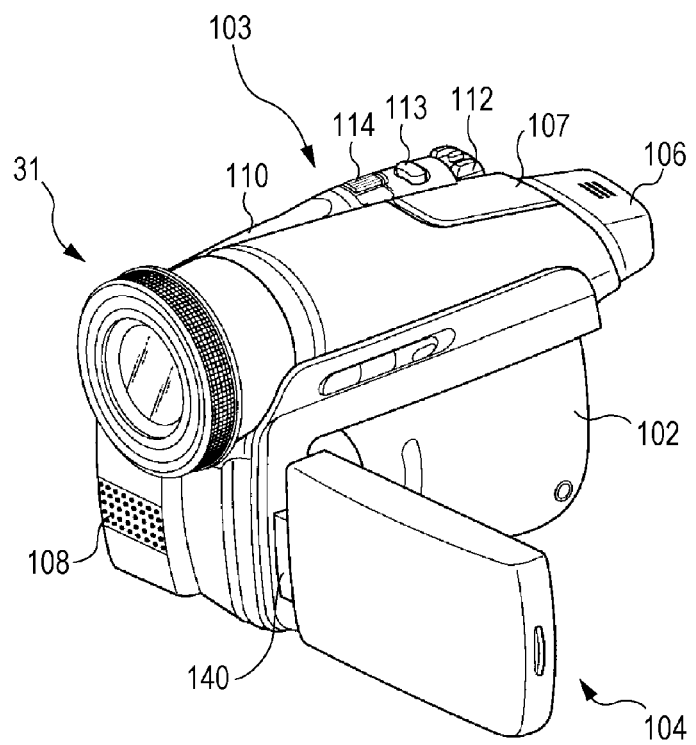
FIG. 11 is a schematic view showing the external configuration of an example image pickup apparatus.

Hereinafter, with reference to FIGS. 11 and 12, an image pickup apparatus will be described that includes a conversion lens unit including a liquid lens according to the present embodiment, the conversion lens unit being attached to the body of the image pickup apparatus. FIG. 11 shows the external schematic configuration of a digital video camera serving as an example of such an image pickup apparatus.

An image pickup apparatus 100 illustrated in FIG. 11 includes an image pickup apparatus body 103 and a conversion lens unit 31, the image pickup apparatus body 103 including, within a hollow exterior casing 102, a lens barrel including an image pickup optical system, an image pickup device, a driving control circuit, and the like. The conversion lens unit 31 includes, as a conversion lens, any one of the above-described liquid lenses according to the present embodiments.

The exterior casing 102 of the image pickup apparatus body 103 is a laterally long and hollow casing that generally has the shape of a rectangular parallelepiped and is used such that the longitudinal direction of the exterior casing 102 is aligned in the front-back direction. Image pickup lenses (not shown in FIG. 11) in the lens barrel are disposed in the front portion of the exterior casing 102 so as to face forwardly. The lens barrel is contained in the exterior casing 102 such that the optical axis of the image pickup optical system contained in the lens barrel is aligned in the horizontal direction. In this example, the image pickup lenses of an image pickup optical system 41 constitute a zoom lens. The image pickup device described below is attached to the back portion of the lens barrel within the exterior casing 102. In addition, a viewfinder unit 106 is provided at the back of the lens barrel and at the back of the exterior casing 102.

An opening for exposing an accessory shoe is provided at the top of the exterior casing 102, the accessory shoe being used for replaceably attaching an accessory such as an external video light or an external microphone. The accessory shoe is provided immediately before the viewfinder unit 106 and is normally covered by a shoe cap 107 that is removable and configured to open or close the opening Furthermore, a stereo microphone 108 is contained in the lower front portion of the exterior casing 102. In addition, the light-emitting portion of a flash unit (not shown) is provided in the upper front portion of the lens barrel, the flash unit being integrated into the exterior casing 102.

A gripping portion 110 for gripping the exterior casing 102 is provided on a side surface of the exterior casing 102. This gripping portion 110 also functions as a cover member for a mechanical deck (not shown) contained under the gripping portion 110. For example, opening the upper portion of the gripping portion 110 outward exposes the cassette insertion opening of the internal mechanical deck and allows the operation of insertion or removal of a cassette tape or the like.

Furthermore, a power switch 112 also functioning as a mode selection switch, a shutter release button 113 for taking freeze-frame pictures, and a zoom button 114 for continuously zooming in (teleconversion) or zooming out (wideconversion) on an image in a predetermined range are provided in an upper portion behind the gripping portion 110. Furthermore, a record button (not shown) is provided under the power switch 112. In addition, a record button (not shown) is provided under the power switch 112. A battery box portion for removably receiving a battery unit serving as a portable power supply is provided beside the record button, that is, in the back surface of the exterior casing 102.

A display unit 104 is inclinably provided on the exterior casing 102 with a connection member 140 therebetween on the side opposite the gripping portion 110. The display unit 104 functions as, for example, a viewfinder or a touch panel and includes a liquid crystal panel or the like.

In addition, the conversion lens unit 31 is attached in front of the image pickup optical system of the image pickup apparatus body, that is, in front of the image pickup lenses.

Figure 12:
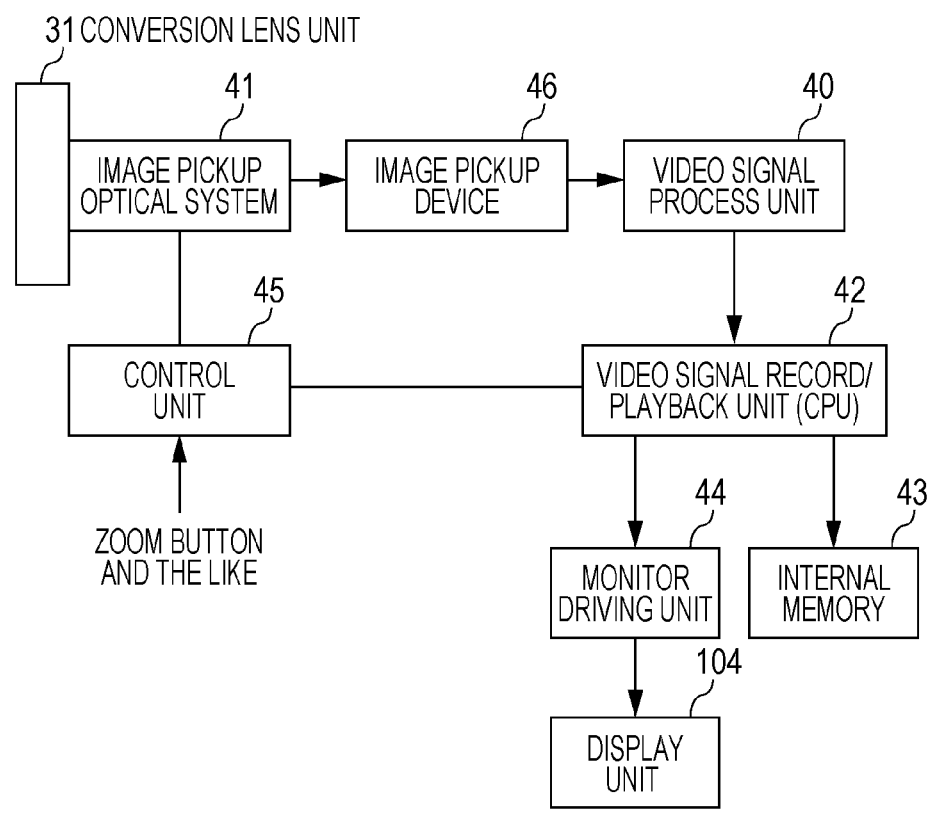
FIG. 12 is a block diagram showing an example configuration of an example image pickup apparatus.

FIG. 12 is a block diagram showing the schematic configuration of the main portion of the image pickup apparatus 100.

The image pickup apparatus 100 includes the image pickup optical system 41; an image pickup device 46 configured to photoelectrically convert subject light formed through the image pickup optical system 41 into signals and output these signals; a video signal process unit 40 configured to process the signals fed from the image pickup device 46; and a video signal record/playback unit 42 configured to record and playback predetermined video signals into which the signals have been processed by the video signal process unit 40.

As described above, the image pickup lenses included in the image pickup optical system 41 constitute a zoom lens. The image pickup device 46 includes a CCD (charge coupled device) image sensor, a CMOS (complementary metal oxide semiconductor) image sensor, or the like. The video signal record/playback unit 42 includes, for example, an arithmetic circuit containing a microcomputer (CPU). The video signal record/playback unit 42 is connected to, in addition to the video signal process unit 40, an internal memory 43 for recording video signals, a monitor driving unit 44 for driving the display unit 104, a control unit 45 for controlling the image pickup optical system 41, and the like. The control unit 45 receives operation signals, from the outside, for, for example, operating the zoom button 114. The positions of the lenses of the image pickup optical system 41 are adjusted on the basis of signals from the control unit 45.

The image pickup apparatus 100 having the above-described configuration allows normal shooting, wide shooting, and macro shooting while the conversion lens unit 31 is attached to the image pickup apparatus 100.

First, a case where normal shooting is performed with the image pickup apparatus 100 will be described. In this case, the conversion lens unit 31 is operated and adjusted such that the second transparent member 3 becomes flat. When the second transparent member 3 is flat, the conversion lens does not provide the wideconversion function or a macro function. As a result, the image pickup apparatus 100 receives the same image as in the case where the conversion lens unit 31 is not attached and hence the image is taken under a magnification setting of the image pickup optical system, the setting being set with the image pickup apparatus body 103.

Next, a case where wide shooting is performed with the image pickup apparatus 100 at the wide end of the image pickup apparatus body 103 will be described. First, the zoom button 114 is used to operate the image pickup optical system 41 including the zoom lens such that the image pickup optical system 41 of the image pickup apparatus body 103 is at the wide end (wide angle end) where the image pickup optical system 41 has the minimum focal length. In this state, the conversion lens unit 31 is operated such that the second transparent member 3 of the conversion lens has a concave shape. When the second transparent member 3 has a concave shape, the conversion lens becomes a wide end converter having a wide conversion function and hence the view angle of an image received by the image pickup apparatus 100 is increased toward the wide angle side.

Thus, the curvature of the second transparent member 3 can be continuously changed into a desired curvature by operating and adjusting the conversion lens unit 31. In this way, the magnification can be freely changed at any view angle up to the maximum view angle toward the wide angle side at the wide end of the image pickup optical system 41 of the image pickup apparatus body 103.

Next, a case where macro shooting is performed with the image pickup apparatus 100 at the tele end of the image pickup apparatus body 103 will be described. First, the zoom button 114 is used to operate the image pickup optical system 41 including the zoom lens such that the image pickup optical system 41 of the image pickup apparatus body 103 is at the tele end (telephoto end) where the image pickup optical system 41 has the maximum focal length. In this state, the conversion lens unit 31 is operated such that the second transparent member 3 has a convex shape. When the second transparent member 3 has a convex shape, the conversion lens becomes a close-up lens having a macro function and hence shooting at a position closer to a subject can be performed. Also in this case, the curvature of the second transparent member 3 can be continuously changed into a desired curvature by operating and adjusting the conversion lens unit 31. In this way, the distance from the image pickup apparatus body 103 to a subject can be freely selected.

In summary, use of the image pickup apparatus 100 including the conversion lens unit 31 including a liquid lens according to the present embodiment allows switching among wide shooting, normal shooting, and macro shooting while the conversion lens unit 31 is attached in front of the image pickup optical system 41 of the image pickup apparatus body 103. In addition, since an image pickup apparatus according to the present disclosure includes the conversion lens unit 31 including a liquid lens that is chemically stable according to the present disclosure, such an image pickup apparatus can be used stably for a long period of time.

REFERENCE SIGNS LIST 1, 9, 11, 21 liquid lens
2 first transparent member
3 second transparent member (deformation membrane)
4 liquid
5 enclosed space
6 connection part
7, 8 frame
14 diaphragm
31 conversion lens unit
100 image pickup apparatus
103 image pickup apparatus body It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A liquid lens comprising:
   a pair of transparent members at least one of which is a deformable deformation membrane formed of a fluorinated elastomeric membrane; and
   a transparent liquid composed of a silicone oil not having compatibility with the fluorinated elastomeric membrane, the transparent liquid filling an enclosed space sandwiched between the pair of transparent members.

2. The liquid lens according to claim 1, wherein the silicone oil is a silicone oil having:
   (a) a weight-average molecular weight of 500 or more; and
   (b) a viscosity of 50 (25° C. mm2/s) or more.

3. The liquid lens according to claim 2, wherein the silicone oil is one of a methylphenyl silicone oil and a dimethyl silicone oil.

4. An image pickup apparatus comprising:
   an image pickup apparatus body including an image pickup optical system; and
   a liquid lens including a pair of transparent members at least one of which is a deformable deformation membrane formed of a fluorinated elastomeric membrane, and a transparent liquid composed of a silicone oil not having compatibility with the fluorinated elastomeric membrane, the transparent liquid filling an enclosed space sandwiched between the pair of transparent members, wherein the liquid lens is attached to an object side position of the image pickup optical system of the image pickup apparatus body.

5. The liquid lens according to claim 4, wherein the silicone oil is a silicone oil having:
   (a) a weight-average molecular weight of 500 or more; and
   (b) a viscosity of 50 (25° C. mm2/s) or more.

6. The liquid lens according to claim 5, wherein the silicone oil is one of a methylphenyl silicone oil and a dimethyl silicone oil.

* * * * *